Sept. 28, 1971 R. H. KAROL 3,608,367
SOIL CONSOLIDATION APPARATUS
Filed Dec. 26, 1968 2 Sheets-Sheet 2

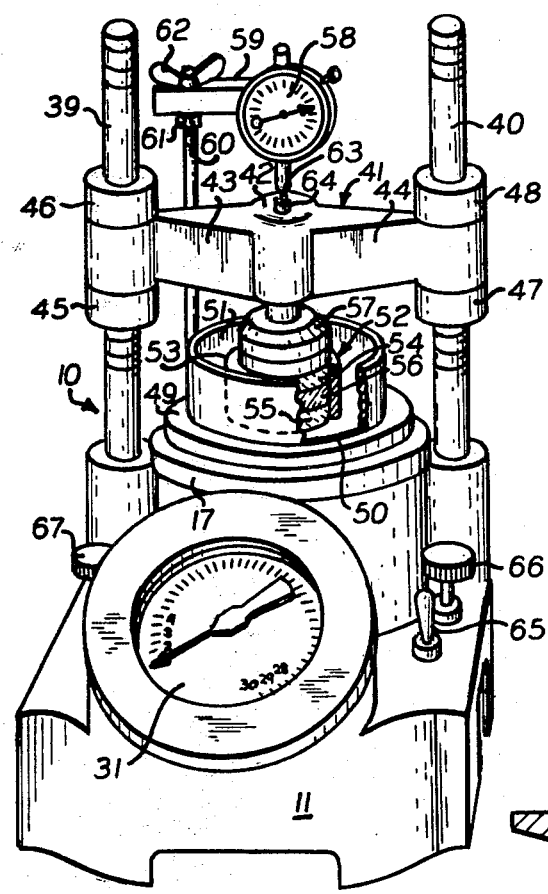
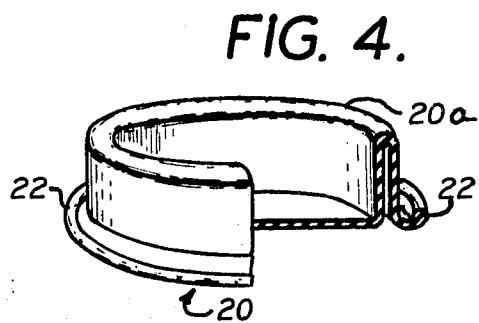
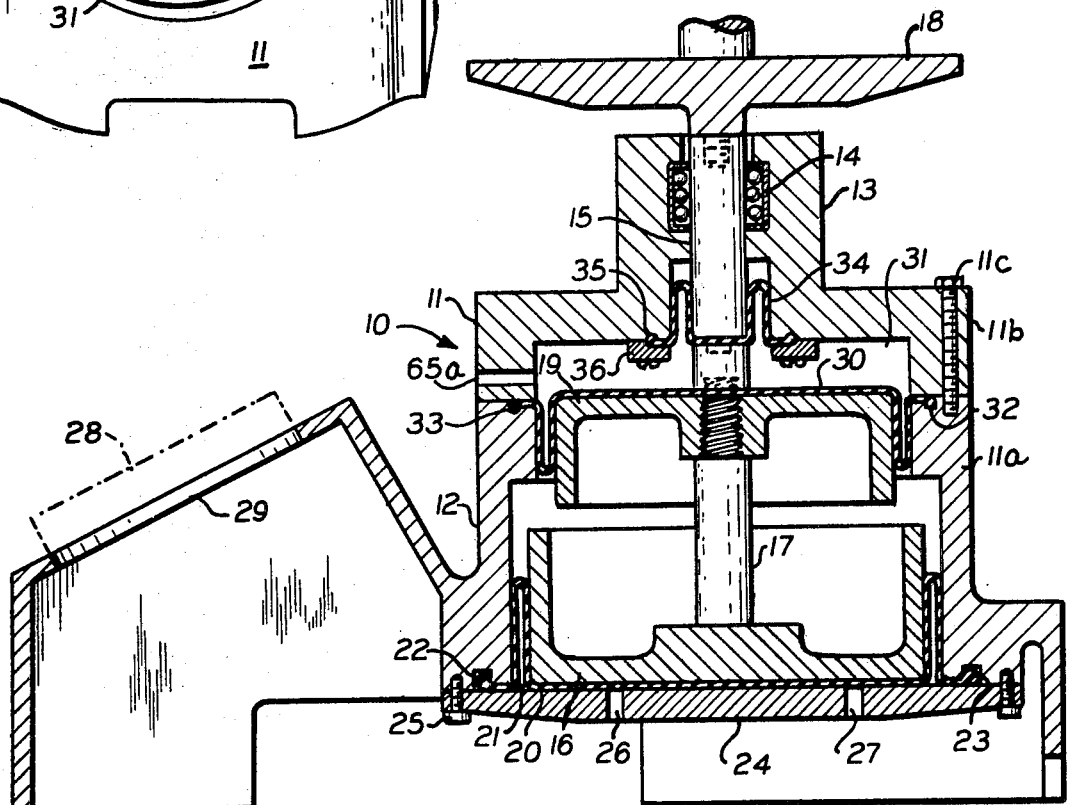

INVENTOR
REUBEN H. KAROL
BY
ATTORNEY.

United States Patent Office 3,608,367
Patented Sept. 28, 1971

3,608,367
SOIL CONSOLIDATION APPARATUS
Reuben H. Karol, 261 S. Adelaide Ave.,
Highland Park, N.J. 08924
Filed Dec. 26, 1968, Ser. No. 786,914
Int. Cl. G01n 3/08
U.S. Cl. 73—94                                         4 Claims

ABSTRACT OF THE DISCLOSURE

An apparatus employing a plurality of single-convolution diaphragms for accurately testing the consolidation of soil samples or the like. The diaphragms facilitate the use of selective net forces on the samples through diaphragm force differentials, or the incremental, integration of diaphragm forces in order to give accurate specimen loading.

---

This invention relates generally to an apparatus for the consolidation testing of materials, such as sub-surface soils, and is an improvement over the apparatus disclosed in my U.S. Pat. 3,054,286 issued Sept. 18, 1962 and entitled "Soil Consolidator." More particularly, the invention relates to an improved and highly accurate apparatus for testing and measuring the time and consolidation characteristics of soils by the application of incremental pressures through a fluid medium by means of a plurality of single-convolution diaphragms.

It is basic that the application of stress to any material will cause a corresponding strain. For materials such as wood and steel, the strain caused by an application of stress occurs simultaneously with the stress. Fine-grained solids, on the other hand, usually exhibit a measurable time lag between the application of stress and the resulting strain. It is most noticeable in soils, and particularly saturated or nearly saturated soils of low permeability. This phenomenon is called consolidation.

In soils, the pore or void spaces between particles form tortuous inter-connecting passages, through which fluids can flow. The sizes of the passages, and therefore the void ratio, are functions of soil structure, particle shape and size, and load on the soil. The void ratio is limited by the condition that it cannot be less than zero and that the soil particles must be close enough to be in contact.

Once a soil has been formed, its particle shape and size and its structure remain virtually unchanged. Thus, changes in void ratio must be due to changes in pressure. Since the grains of the soil are practically incompressible, any change in volume that occurs must be due to a change in the volume of the voids.

For example, if a saturated, fine-grained soil at equilibrium is under a pressure $p$, at a void ratio $e$, and surface loading of the soil increases the load to $P$, the instant after the increase in load the void ratio remains at $e$, and therefore, the load on the soil structure is still $p$. The excess load $P-p$, is instantaneously carried by the water in the soil pores as excess hydrostatic pressure. The sudden increase in fluid pressure at the loaded area causes water to start moving from the loaded area to points of lower potential. The outward flow of water reduces the excess hydrostatic pressure, reduces the volume of voids, and transfers the pressure reduction in the water to an increase in load on the soil structure.

The rate at which the water will flow from the loaded area is a function of the excess hydrostatic pressure. Since the excess hydrostatic pressure decreases as water flows from the loaded area, the rate at which the excess load is transferred to the soil is a constantly decreasing rate. Theoretically, equilibrium will never be reached but for practical purposes, the process may be considered complete when the rate of volume change reduces to insignificance.

Soil masses consisting mainly of large particles such as sand and gravels have relatively large pore passages through which water can flow rapidly. For such soils the process described above may be completed in a matter of minutes or hours. Soil masses consisting mainly of fine grains such as silts and clays, may take months or years to approach equilibrium conditions. A structure built on such material may continue to subside during its entire life.

Consolidation is actually a three-dimensional process. Water flows away in all directions from a loaded saturated soil mass, and changes in dimension also occur in all directions. For an elastic material three-dimensional analysis is possible and practical, but for a material with stress-strain relationships as complex as soil, three-dimensional analysis is not feasible.

One-dimensional analysis, however, has many direct applications to soils engineering. For example, a clay layer at some depth below the ground surface, between two layers of sand may be subjected to an increased surface load. If a large area of the surface is loaded, the water in the clay will flow vertically into the much more permeable sand layers, rather than horizontally through the relatively impermeable adjacent clay. Practically all of the volume change will be due to a change in the thickness of the clay layer. This common case is essentially one-dimensional.

When surface loading is contemplated, as, for example, in building a new and heavy permanent structure such as a building, bridge abutments, permanent road-beds, and the like, it is essential to the engineer that he know how much consolidation of the soil to expect, and over what period of time. It is, therefore, the common practice to test for the consolidation characteristics of fine-grained soils which underlie the foundations for such permanent structures, in order to determine the amount-consolidation and the time-consolidation relationships.

In essence, the apparatus of my aforementioned patent utilizes a load applying means for subjecting the soil test sample to a predetermined or controlled force. The load applying means comprises a single-convolution diaphragm formed from a natural or synthetic flexible plastic material which defines a chamber expandable directly by liquid or gas under pressure introduced into the chamber.

Consolidation tests are performed by applying a predetermined load and maintaining that load for a period which may be hours, days, weeks or even of longer duration. During this period the soil sample is compressed as the water is squeezed out, and as the sample is compressed the chamber expands. The single-convolution diaphragm is constructed and placed in such a fashion that it does not expand under load, but rather rolls along in the annular space defined by the concentric walls between a cylinder and piston arrangement. The force required to move this type of diaphragm is negligible and remains substantially constant for all positions thereof so that there is in effect no spring rate to contend with. This means that the actual load applied to the test sample remains constant regardless of sample compression so that the apparatus is suitable for testing all types of soils including very plastic ones.

The use of a single convolution diaphragm eliminated many of the disadvantages of earlier soil consolidation testing devices, including some still being marketed today. For example, the prior art testing devices employed lever arms upon which weights are suspended in order to apply the soil sample test loads. This resulted in test errors of unknown magnitudes due to mechanical friction in the various moving parts, wear of the fulcrum and pinions, and inaccuracies in measuring the lengths of the lever arm sections and the suspended weights. More recently, a metallic bellows type of expandable diaphragm has been used in lieu of the suspended weights. However, since a metallic bellows type expandable diaphragm occupies a relatively large volume even when unexpanded, it is necessary to fill the bellows with a liquid in order to be able to subject the test specimen to a load substantially instantaneously. Further, it requires a measurable force to expand metallic diaphragms, introducing an undesirable spring rate factor. When using a single convolution extensible diaphragm, the latter forms a chamber of extremely small volume when the test specimen is not being subjected to pressure so that this chamber may be expanded directly by gas. The consequent elimination of liquid from soil testing device incorporating a single-convolution diaphragm eliminates the necessity of a liquid storage reservoir and also eliminates the undesirable effects of liquid leakage encountered with the bellows type diaphragm. The single-convolution diaphragm is also suitable for other tests upon soils, such as the unconfined compression test and the triaxial test. It also makes possible the use of much larger consolidation soil samples than could be used with a metallic bellows testing device. However, some serious drawbacks are still in evidence.

The single-convolution extensible flexible diaphragm is generally supported between a piston and cylinder in such a fashion that air pressure applied to the cylinder develops a corresponding force on the piston and its shaft. The magnitude of the air pressure is controlled by an air regulator and measured by a pressure gage. In practice, the gage reading is used with a calibration chart to set the desired sample load. Thus, the accuracy in setting loads depends upon the sensitivity of the air regulator and the accuracy of the gage. For best performance, these two components must be matched in their pressure capacities.

Economy of design and simplicity of operation dictate the use of one regulator and one gage for each loading system. Due to the unique loading requirements of the consolidation test, this may introduce substantial errors in setting the lower loads. Assume, for example, that maximum load capacity is obtained with a 100 p.s.i. gage at its maximum reading. Using a high precision test gage, typical gage accuracy would be ¼ of 1%. Gage manufacturers specify accuracy in terms of gage capacity. Thus the actual meaning of ¼ of 1% accuracy in this case is that any reading on the dial face is within plus or minus ¼ p.s.i. of the true pressure. Since, due to the peculiar nature of a consolidation test, the first load may be as little as 1/256 of the final load, on a 100 p.s.i. gage, this first load would be set at about ⅜ p.s.i. Since this reading could vary from the true load by as much as plus or minus ¼ p.s.i., the actual error in load may be as high as 70%. In setting the second load (which is generally twice the first), the actual error could be as high as 35%, etc. The most obvious procedure to alleviate the problem would be to use more accurate gages. However, the best obtainable, accurate to about 1/20 of 1%, would still provide errors of as much as 14% in setting the first or lowest consolidation load. Such errors are still too high, since it is generally desirable to set loads with an accuracy of 1% or better. It would also be possible to use an auxiliary gage and regulator to reduce the error in setting the lower loads. Using a 10 p.s.i. gage of ½ of 1% accuracy and a 100 p.s.i. gage of ¼ of 1% accuracy with matching regulators, and assuming the 100 p.s.i. reading is equivalent to 16 tons per square foot on the soil samples, the possible errors in setting loads are as follows:

| Sample load, t.s.f. | 100 p.s.i. gage reading | Possible error, percent | 10 p.s.i. gage reading | Possible error, percent |
|---|---|---|---|---|
| 1/16 | 0.391 | ±64 | 0.391 | ±12.8 |
| ⅛ | 0.781 | ±32 | 0.781 | ±6.4 |
| ¼ | 1.562 | ±16 | 1.562 | ±3.2 |
| ½ | 3.125 | ±8 | 3.125 | ±1.6 |
| 1 | 6.25 | ±4 | 6.25 | ±0.8 |
| 2 | 12.5 | ±2 | | |
| 4 | 25 | ±1 | | |
| 8 | 50 | ±½ | | |
| 16 | 100 | ±¼ | | |

Although much greater accuracy has been achieved, there are obviously still four separate loads indicated in which the accuracy does not meet the ±1% standard desirable. The desired accuracy could be obtained for the 2 t.s.f. load by using a third gage of 20 p.s.i. capacity with a matching regulator. However, the piping and switching arrangement for three gages becomes complex and unwieldly. Alternatively, the use of a 100 p.s.i. gage of 1/20 of 1% accuracy would also reduce the margin of error at the 2 t.s.f. load to acceptable limits. Neither of these expedients however, is adequate for reducing errors in the four smallest loads, because bourdon tube gages do not function properly at very low pressures, and, in fact, are presently not generally manufactured in capacities lower than 15 p.s.i. The sensitive element used in pressure gages with capacities of less than about 10 p.s.i. is a stack of nested metal diaphragms, and gages using these elements will generally not have better accuracy than ½ of 1% irrespective of capacity.

The problem of accuracy is further complicated by the desire to use a single testing machine for many soils. Thus, for a soft clay it may be desirable to load from 1/32 t.s.f. to 8 t.s.f., while for a stiff clay, loads may go from ⅛ t.s.f. to 32 t.s.f. In this instance, the smallest load is less than one thousandth of the largest and errors in setting loads on a machine capable of loading from 1/32 to 32 ts.f. may range as high as 256%.

In order to greatly ameliorate or eliminate the aforementioned problems encountered in attempting to obtain accurate consolidation test loads, the present invention contemplates the use of multiple single-convolution diaphragms. Each of the diaphragms forms an expandable pressure chamber which is adapted to be selectively used in conjunction with at least one other pressure chamber at the option of the user in order to be able to obtain accurate test loads by virtue of using pressures which are measured in the more accurate portions of the pressure gage range. To this effect, in one embodiment of the present invention a system of two or more opposed single-convolution diaphragms, one of which is somewhat larger than the other, may be used. When measuring the smaller test loads, air pressure may be applied to both diaphragms so as to provide a closely controlled net force. In another embodiment of the present invention a system of two or more integrating diaphragms, one of which is considerably smaller than the other, may be employed. When measuring the smaller test loads, at the option of the user, pressure may be applid to the smaller diaphragm to thereby provide a smaller force with a great degree of accuracy.

Accordingly, a primary object of this invention is to provide a novel and improved apparatus for testing the consolidation of materials.

Another object is to provide a novel soil consolidation testing apparatus in which the load applied to the test soil specimen remains substantially constant as the specimen is compressed.

A further object is to provide a novel soil consolidation testing apparatus utilizing a plurality of single-convolution diaphragms each defining an expandable fluid-operated pressure chamber.

A still further object is to provide a novel soil consolidation testing apparatus employing a pair of opposed single-convolution diaphragms adapted to provide selective controlled net loads on the soil test specimen.

Yet another object is to provide a novel soil consolidation testing apparatus employing a pair of integrating single-convolution diaphragms adapted to provide selective controlled combined loads on the soil test specimen.

These as well as other objects of the present invention will become apparent upon referring to the following detailed description of the accompanying drawings in which:

FIG. 1 is a perspective view of a soil consolidation testing apparatus constructed in accordance with the present invention;

FIG. 2 is a cross-section, in elevation, of one embodiment of the expandable chamber portion of the apparatus with the piston at the bottom of its travel;

FIG. 4 is a perspective view of a single-convolution diaphragm in its collapsed state.

Figure 3:
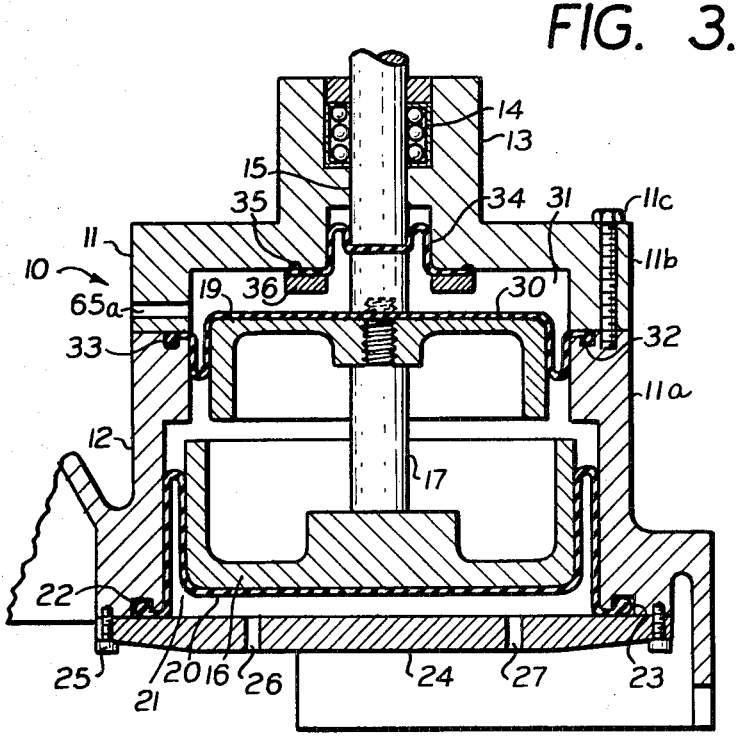
FIG. 3 is a cross-section, in elevation, of the apparatus shown in FIG. 2 with the piston at the top of its travel.

Referring now to the drawings, and particularly FIGS. 1 and 2, the novel soil consolidation testing apparatus 10 comprises a cast metal base 11, consisting of a lower section 11a and upper section 11b, and fastened by bolt 11c, to which the other components are secured. Formed integrally is a cylinder portion 12 and a guide portion 13 formed concentrically located with respect to cylinder portion 12. A ball bushing 14 is disposed within a central bore of guide portion 13 and is fixedly secured thereto.

A piston assembly 15 includes a first piston 16 threaded to the lower end of a shaft or piston rod 17, and a pressure plate 18 threaded to the upper end of piston rod 17. The piston rod 17 is of sectioned construction and includes a second piston 19 threaded thereto intermediate its end portions in the upper half of cylinder portion 12. The diameter of the piston 19 is somewhat smaller than the diameter of piston 16 so as to provide a predetermined area ratio between the pistons 16 and 19. Similarly, the interior diameter of the upper half of the cylinder portion 12 is smaller than that of the lower portion of the cylinder 12 within which the piston 16 is received. The upper section of piston rod extends through the ball bushing 14 in close sliding and relatively friction-free relationship therewith.

A first single-convolution diaphragm 20, constructed of rubber or a synthetic gas tight flexible material, is positioned below piston 16 and forms a portion of a chamber 21 which is expandable in a vertical direction. For high pressure applications diaphragm 20 may be preferably constructed of nitrile rubber reinforced with a strong lightweight fabric. A circular bead 22 which forms the outer edge of the diaphragm 20, as shown in FIG. 4, is disposed within an annular groove 23 in the bottom of base portion 11a. Cover plate 24, secured to the bottom of base 11 by means of screws 25, maintains the bead 22 firmly positioned within groove 23.

The cover plate 24 is provided with an air inlet aperture 26 and an air exhaust aperture 27 both communicating with expandable chamber 21. A suitable conduit may connect air inlet aperture 26 with valve means and pressure regulator means (not shown) to a source of high pressure gas and to a test gage 28 positioned in base aperture 29. The air exhaust aperture 27 may be connected through a suitable bleed and control valve (not shown) to atmosphere.

A second single-convolution diaphragm 30, constructed of the same material as diaphragm 20 but somewhat smaller in area, is positioned above piston 19 and forms a portion of a chamber 31 which is expandable in a vertically downward direction. A circular bead 32 which forms the outer edge of diaphragm 30 is disposed and clamped in an annular groove 33 between base portions 11a and 11b. The central portion of diaphragm 30 is clamped between contiguous sections of piston rod 17.

In order to provide a relatively frictionless seal between chamber 31 and the exterior of the apparatus 10, a third small single-convolution diaphragm 34 is positioned at the upper end of chamber 31, with its outer edge forming a bead 35 clamped by a ring member 36.

Diametrically opposed threaded uprights 39, 40 extends upwardly from base 11. Cross member 41 comprises an enlarged annular hub portion 42 and radially extending arms 43, 44 with the free ends of arms 43, 44 having clearance holes which receive the uprights 39, 40, respectively. Nuts 45, 46 are mounted to upright 39 and positioned on opposite sides of arm 43 while nuts 47, 48 are similarly mounted to upright 40 on opposite sides of arm 44. Thus lower nuts 45 and 47 establish the vertical position of cross member 41 while upper nuts 46 and 48 rigidly clamp cross member 41 in place.

Base plate 49 is seated upon pressure plate 18 and is provided with a circular groove 50 which receives a transparent annular ring 51. Sample holder 52, comprising floating ring 53 and two porous stone plates 54, 55 is disposed within transparent ring 51. Holder 52 is adapted to receive test specimen 56 between porous stone plates 54, 55. Upper plate 57 rests upon upper stone plate 54 and is provided with a top surface which matches the central hub 42 of cross member 41. A ball bearing or a flat plate, neither of which are illustrated is often placed between upper plate 57 and cross member 41.

Deflection indicator 58 is mounted to one end of arm 59 whose other end is provided with a clearance hole which receives threaded shaft 60 extending upwardly from base plate 49. Hexagonal nut 61, disposed below arm 59, and wing nut 62, disposed above arm 59 adjust the level of indicator 58. Pin 63 extends downwardly and engages the upper end of floating member 64 mounted to and extending through hub 42, whose lower end rests upon upper plate 57.

Operation of the consolidation testing apparatus 10 proceeds in the following manner. The operator throws the operating lever whereby all gas pressure is exhausted from chambers 21 and 31, thereby permitting the pistons 16 and 19 to move to the bottommost position under the gravitational weight of the piston assembly 15, as illustrated in FIG. 2.

A sample is placed in holder 52 and cross member 41 adjusted to a position wherein floating member 64 rests upon upper plate 57 but hub 42 is spaced therefrom. Gage pin 63 is then brought into contact with floating member 64. The dial of indicator 58 is set to zero and then the apparatus is adjusted so that there is a minute clearance between hub 42 and the top of upper plate 57.

Gas pressure is now admitted into expandable chamber 21 through aperture 26 so as to cause the piston 16 to rise with a resultant expansion of chamber 21. The expansion of chamber 21 is confined by the cylinder 12 to a single upward direction. During this expansion the single-convolution portion 20a of the diaphragm 20 is disposed within the space between piston 16 and lower portion 11a of cylinder 12. Similarly, the concurrent upward motion of piston 19 moves the single-convolution portion 30a of diaphragm 30 within the space between piston 19 and the upper section of lower base portion 11a of cylinder 12. During this expansion the single-convolution portions 20a and 30a of diaphragms 20 and 30 merely roll so that the force required to work the diaphragms is negligible for all positions thereof and in effect, there is no undesirable spring rate to contend with.

As indicated previously, when measuring the lower load ranges on the soil samples, the force may be accurately controlled by pressurizing to a predetermined degree expandable chamber 31. This may be done by pressurized gas inlet through an inlet aperture 65a in base portion 11b, and an exhaust port (not shown) which operate similar to apertures 26 and 27 in cover plate 24. Air or gas inlets 26 and 65a are preferably connected to a single source of pressure fluid, and include valve control means (not shown) whereby pressurized gas may be selectively or simultaneously supplied to inlets 26 or 65a. By controlling the pressures in chambers 21 and opposing chamber 31, so as to obtain a precise net differential load or force, extremely accurate pressures and compressive forces on the consolidation test sample may be recorded. Thus, by experimentation, it has been shown that using an area ratio between diaphragms 30 and 20 of 7:8, an 8-fold increase in accuracy is obtained in the critical lower load ranges. When using a ratio of, for example, 15:16 a 16-fold increase in accuracy has been observed. Greater degrees of accuracy may be readily obtained by using additional diaphragms of three, four or more diaphragm loading systems.

Figure 5:
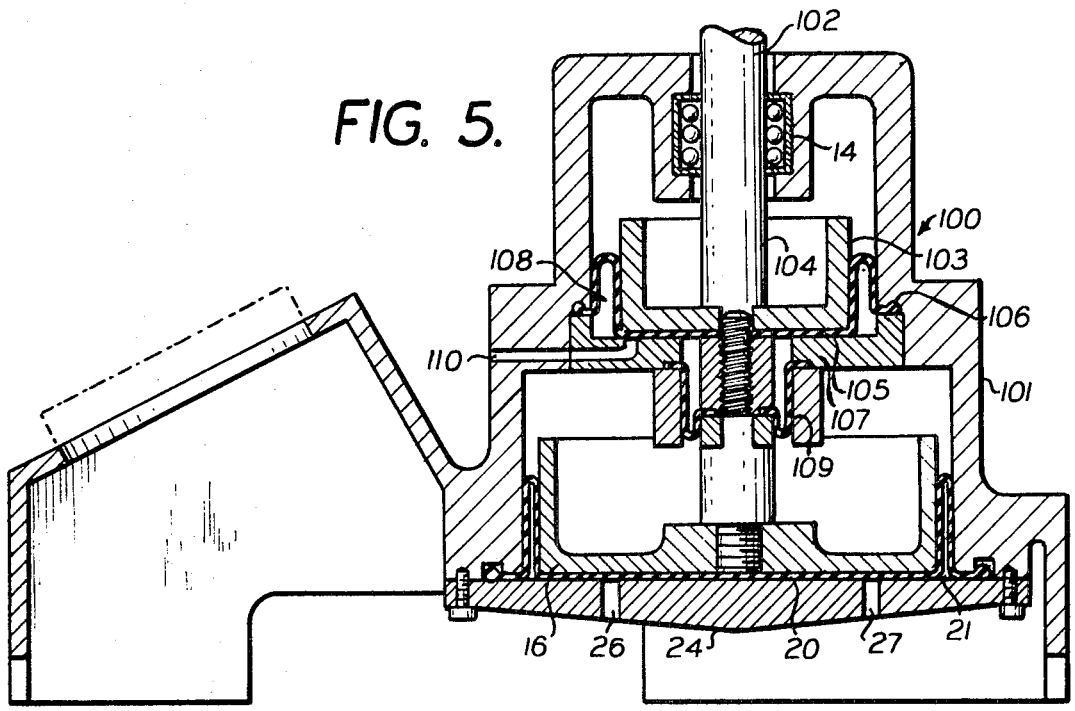
FIG. 5 is a cross-section, in elevation, of a second embodiment of the expandable chamber portion of the apparatus with the piston at the bottom of its travel.

Another method of using the principles of the present invention is illustrated in the embodiment of the testing apparatus shown in FIG. 5 of the drawings. In this embodiment the apparatus 100 includes a cylindrical base 101 which supports a piston assembly 102. Elements of this embodiment which are identical to those of the first embodiment are identified by like reference numerals.

In this embodiment, the piston assembly 102 includes a second piston 103 fastened to the intermediate portion of piston rod or shaft 104. Piston 103 is considerably smaller in area than piston 16 and has a pressure surface acting in the same direction as the pressure surface of piston 16. A second single-convolution diaphragm 105 having an outer beaded edge 106 clamped between cylinder base 101 and a ring member 107, and its central portion fastened to piston rod 104 extends across piston 103 so as to form one portion of an expandable chamber 108. Chamber 108 is separated from expandable chamber 21 by a frictionless seal comprised of a third small single-convolution diaphragm 109 having its outer edge clamped to ring member 107 and its central portion to piston rod 104.

During operation of consolidation test apparatus 100, pressure may be introduced into chamber 21 as in the case of apparatus 10. In this instance, however, at the option of the operator during the application of the lower loads on the test sample, pressure may be introduced into expandable chamber 108 alone through a gas inlet aperture 110. As in the previously described embodiments of FIG. 2, the inlet apertures 110 and 26 are connected to a single source of pressurized gas or fluid. This greatly enchances the accuracy of the gage readings for small loads over single diaphragm apparatuses. As may be readily ascertained, three, four or more integrating diaphragms may be employed to produce consolidation test systems of unprecedented accuracies.

What is claimed is:

1. An apparatus for measuring the consolidation characteristics of a material which comprises a movable means, rigidly mounted means spaced from said movable means, and means for moving said movable means toward said rigidly mounted means; said movable means including a first expandable chamber engageable with said movable means, and a second expandable chamber engageable with said movable means, means adapted to selectively or simultaneously connect said first and second chambers to a source of high pressure fluid whereby said fluid is introduced directly into at least one of said chambers to cause expansion thereof, thereby affecting movement of said movable means toward said rigidly mounted means; said movable means comprising a piston assembly having its first end operatively positioned for engagement by said first expandable chamber and having its other end operatively positioned to engage a specimen holder when the same is positioned between said movable means and said rigidly mounted means; said piston assembly comprising a first piston having an upwardly directed peripheral flange at its first end, a pressure plate at its second end, and piston rod means interconnecting said piston and said pressure plate; said first expandable chamber comprising a single-convolution diaphragm secured into position solely by means engaging the diaphragm along its peripheral edge; a cylinder surrounding said first piston and spaced therefrom; said diaphragm including a portion disposed in the space between the upwardly directed peripheral flange on said first piston and said cylinder, said portion rolling in said space upon movement of said movable means; second piston means having a downwardly directed peripheral flange fastened to said piston rod means intermediate said first and second piston assembly ends; said cylinder including an upper portion of reduced diameter surrounding said second piston means and spaced therefrom, said second expandable chamber being operatively connected to said second piston means and comprising a single convolution diaphragm secured in position solely by means engaging the diaphragm along its outer peripheral edge; said second diaphragm including a portion disposed in the space between the downwardly directed peripheral flange on said second piston means and said cylinder structure; said portion rolling in said space upon movement of said movable means; said pistons being adapted to move to a first position away from said rigidly mounted means due to normal gravitational force; said first expandable chamber being constructed to be of a negligible volume when said movable means is in said first position; a major portion of the upper surface of said first diaphragm being adapted to abut said first piston and the entire lower face of said diaphragm being exposed to said high pressure fluid; and a third single-convolution diaphragm mounted upon said piston assembly at the upper end of said second expandable chamber to provide a relatively frictionless seal immediately thereabove.

2. An apparatus as defined in claim 1 wherein a major portion of the lower surface of said second diaphragm is adapted to abut the radially extending upper surface of said second piston means and the entire upper face of said diaphragm is exposed to a high pressure fluid at the same pressure and from the same source as the high pressure fluid applied to the lower face of said first diaphragm.

3. An apparatus as defined in claim 2 wherein the upper face of said first diaphragm is proportionately larger in area than the lower face of said second diaphragm, whereby high pressure fluid imparted against said diaphragm faces will provide a net lifting force in said movable means in proportion to the ratio of the surface areas of said diaphragm faces.

4. An apparatus as defined in claim 2 wherein the expansion of said first expandable chamber is adapted to cause a proportionate compression of said second expandable chamber.

References Cited

| | | | |
|---|---|---|---|
| 2,702,023 | 2/1955 | Seeloff | 92—98 |
| 2,731,534 | 1/1956 | Hansen et al. | 92—99 |
| 2,846,983 | 8/1958 | Otto | 92—98 |
| 3,054,286 | 10/1962 | Karol | 73—94 |
| 2,916,205 | 12/1959 | Litz | 92—152 |
| 3,465,648 | 9/1969 | Conklin et al. | 91—415X |

RICHARD C. QUEISSER, Primary Examiner

E. J. KOCH, Assistant Examiner

U.S. Cl. X.R.

73—84